April 13, 1965   R. E. ZIMMERMANN   3,178,235
ROTARY FEEDER
Filed March 29, 1963   3 Sheets-Sheet 1
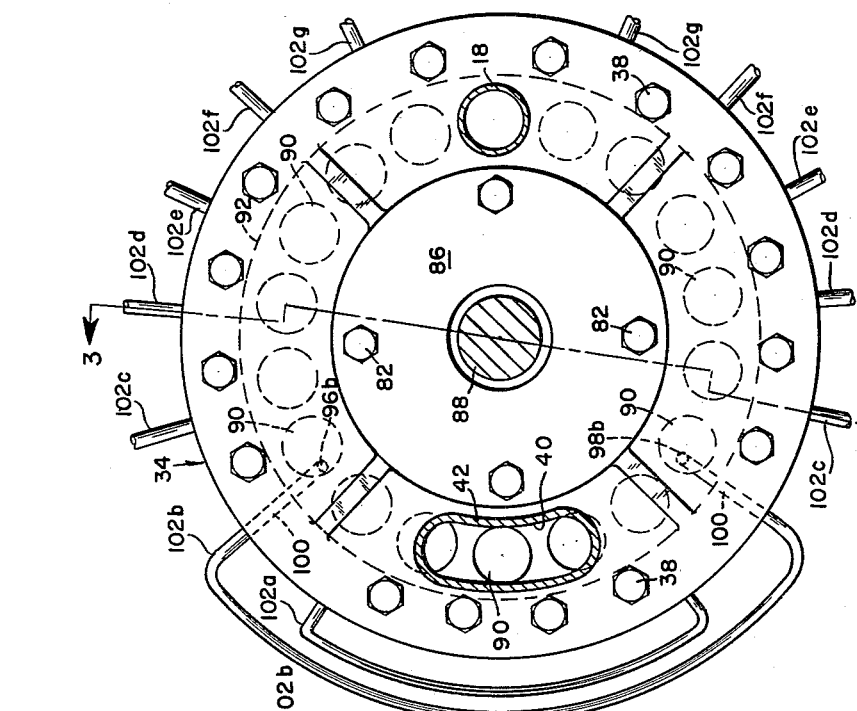
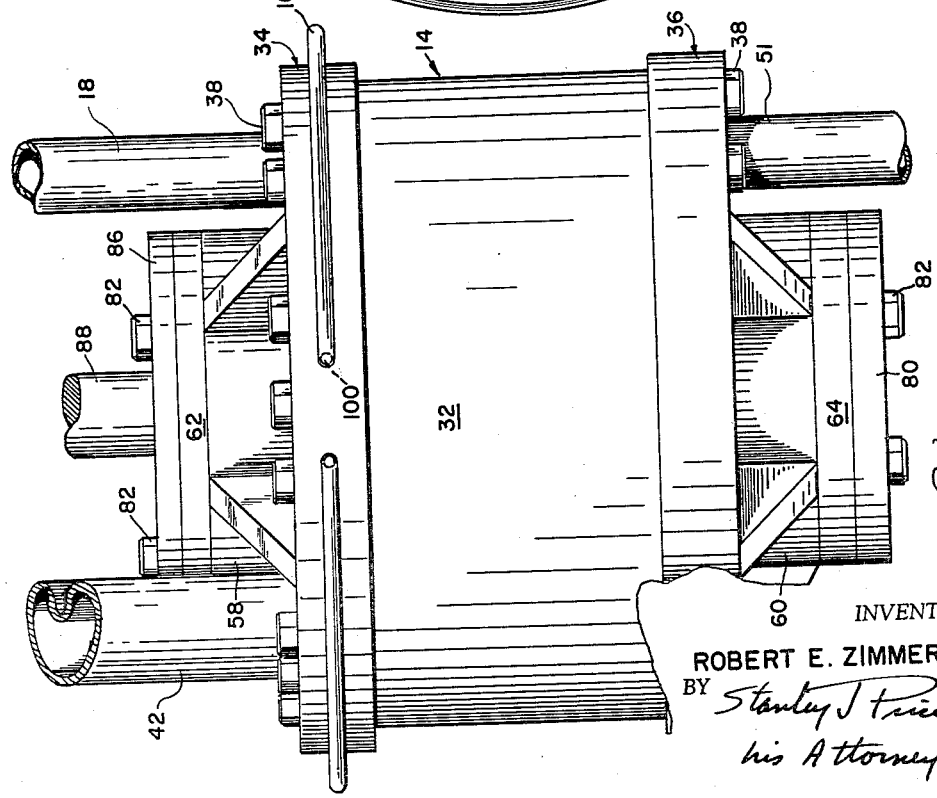
INVENTOR.
ROBERT E. ZIMMERMANN
BY Stanley J Price
his Attorney April 13, 1965   R. E. ZIMMERMANN   3,178,235
ROTARY FEEDER
Filed March 29, 1963   3 Sheets-Sheet 2
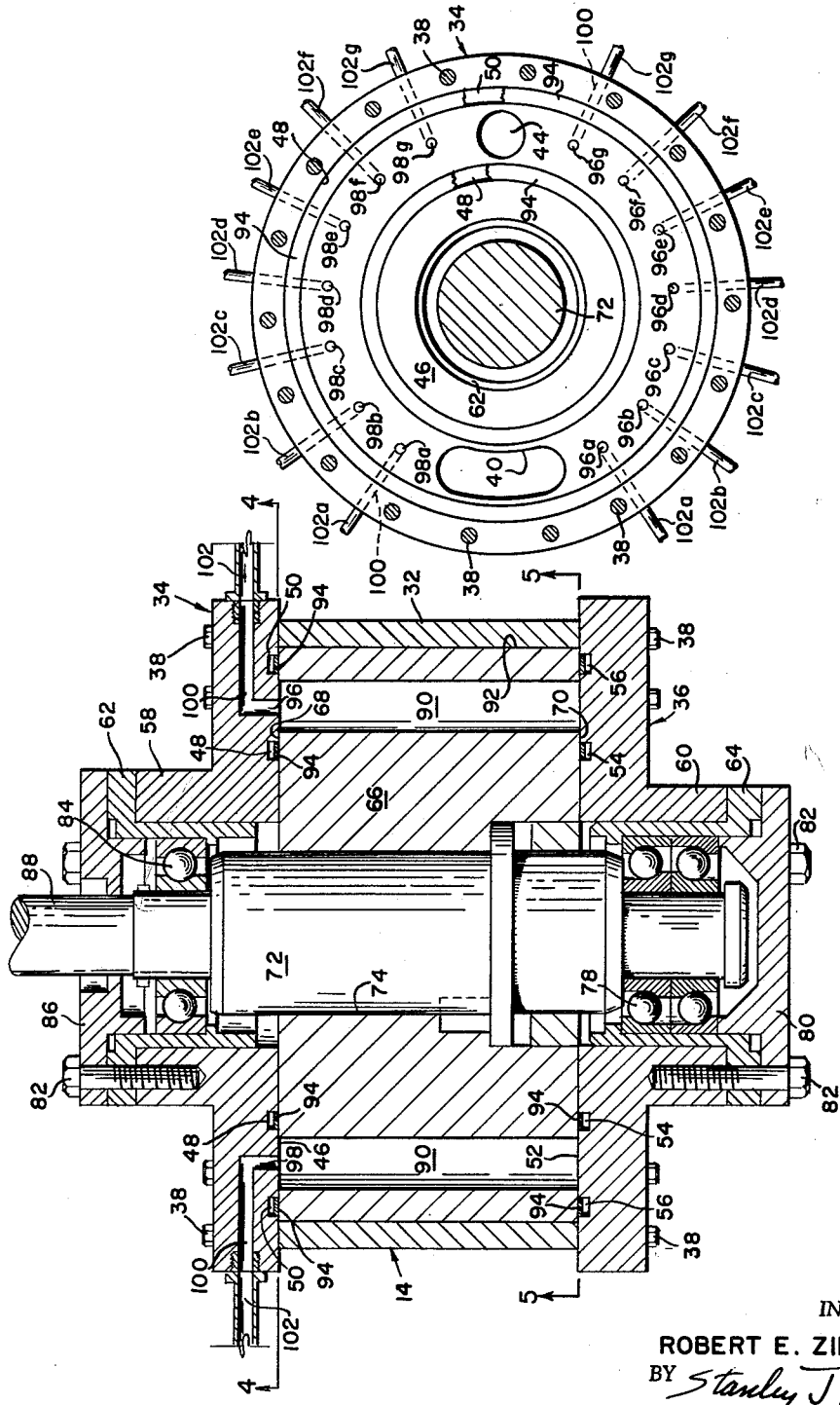
INVENTOR.
ROBERT E. ZIMMERMANN
BY Stanley J. Price
his Attorney April 13, 1965 R. E. ZIMMERMANN 3,178,235
ROTARY FEEDER
Filed March 29, 1963 3 Sheets-Sheet 3
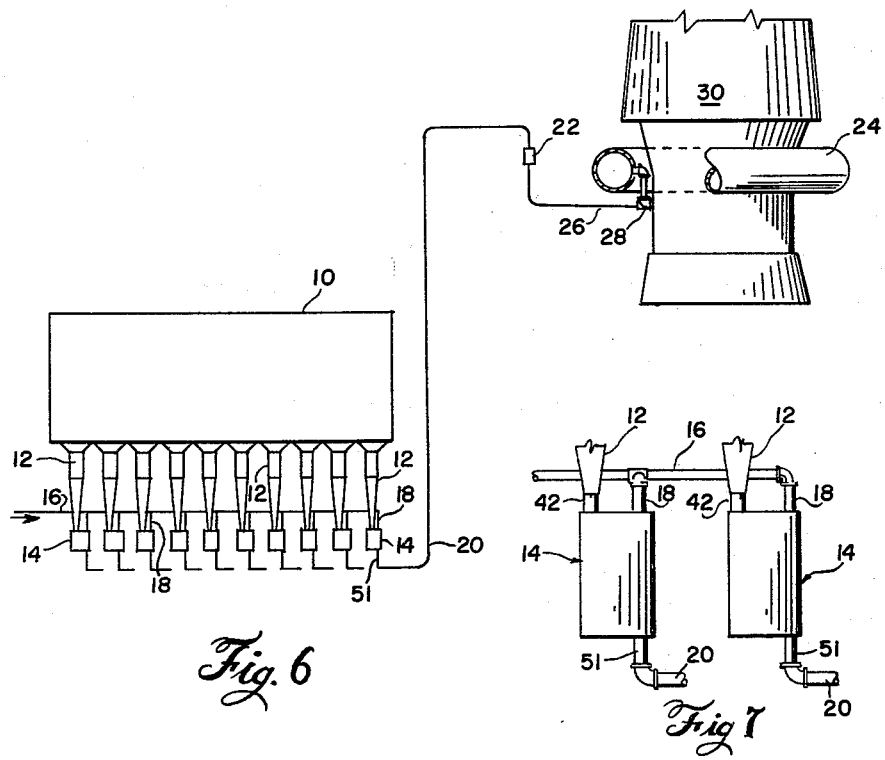
Fig. 6
Fig. 7
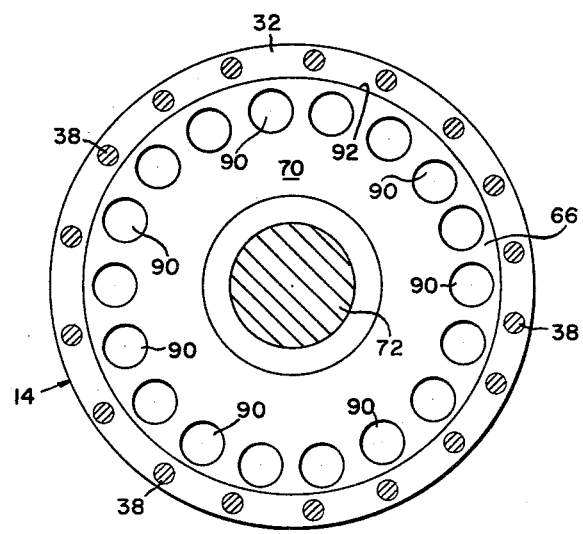
Fig. 5
INVENTOR.
ROBERT E. ZIMMERMANN
BY Stanley J. Price
his Attorney

United States Patent Office 3,178,235
Patented Apr. 13, 1965

3,178,235
ROTARY FEEDER
Robert E. Zimmermann, Genoa, Italy, assignor to Koppers Company, Inc., a corporation of Delaware
Filed Mar. 29, 1963, Ser. No. 268,877
3 Claims. (Cl. 302—49)

This invention relates to a rotary feeder and more particularly to a new and improved rotary feeder for introducing particulate solids such as coal particles into a pressurized fluid carrier.

Rotary feeders have been used in the past to transfer particulate solids from a hopper maintained at atmospheric pressure to a pressurized air stream for delivery to a conversion unit as a fluidized stream. Patents 2,750,233 and 2,750,234 illustrate rotary feeders of the prior art.

The rotary feeders of the prior art have a rotor shaped like a gear wheel with peripheral material receiving pockets. The pockets on the outer periphery of the rotor are arranged to receive a supply of particulate solids at one location, rotate through a preselected arc and discharge the solids at another location. The inlet portion of the feeder is open to atmospheric pressure and the discharge portion of the feeder is subjected to the elevated pressure of the conveying gas. Considerable difficulty is encountered with the presently known rotary feeders in maintaining a positive seal between the inlet to the rotor and the solids outlet. The surfaces of the rotor and casing must be machined to exact tolerances and require plating of abrasive resistant material. It has been found that the useful life of the rotary feeder is severely limited by the wear of the machined surfaces. The wear is caused principally by the abrasive action of the particulate solids introduced into the passing through the rotary feeder.

It has been discovered by changing the configuration of the rotor a more positive seal is obtained between the various parts of the rotary feeder and the close machined tolerances previously required are eliminated, except in the area between the concentric seals. It has also been discovered by cross venting various portions of the rotary feeder that the material carrying pockets are now gradually pressurized and depressurized. This minimizes the differential pressure between the feed inlet and the outlet of the rotary feeder and reduces substantially the uneven forces exerted on the seals.

Briefly, the invention includes a rotor having a plurality of bores or passageways parallel to the rotor axis. The passageways are spaced from each other and inwardly from the peripheral surface of the rotor. The passageways are equidistant from the rotor axis and form a circular series of passageways in the rotor. Suitable concentric seals are provided with the rotary feeder casing on opposite radial sides of the passageways to effectively provide fluid tight compartments therebetween. The feeder casing includes a solids inlet axially parallel with the rotor axis and a solids outlet spaced from and parallel to the rotor axis. Vent means are provided to equalize the pressures within the various rotor passageways on opposite sides of the rotor axis.

Throughout the specification the rotary feeder will be described as a coal feeder used to supply coal particles to a combustion unit such as a blast furnace or the like. It should be understood, however, that the improved rotary feeder herein described can be used with equal facility to transfer other particulate solids in a fluidized state.

Accordingly, it is an object of this invention to provide an improved rotary feeder having a novel rotor configuration and sealing arrangement that reduces wear and increases the useful life of the rotary feeder.

Another object of this invention is to provide a rotary feeder having means to equalize the pressures in the feeder housing on opposite sides of the feeder inlet to thereby pressurize the rotor passageways as the passageways approach the feeder discharge outlet and to simultaneously depressurize the passageways as the passageways approach the feeder inlet.

These and other objects and advantages of this invention will be more completely disclosed and described in the following specification, the accompanying drawings and the appended claims.

In the accompanying drawings there is shown for purposes of illustration one form which the invention may assume in practice.

In the drawings:

FIGURE 1 is a side elevational view of the improved rotary feeder constructed in accordance with the principles of this invention.

FIGURE 2 is a top plan view of the rotary feeder illustrating the pressure equalizing means.

FIGURE 3 is a cross sectional view, a portion thereof shown in elevation, of the rotary feeder taken along the line 3—3 of FIGURE 2.

FIGURE 4 is a cross sectional view of the rotary feeder taken along the line 4—4 of FIGURE 3 and illustrating the inner wall of the casing.

FIGURE 5 is a cross sectional view taken along the line 5—5 of FIGURE 3 and illustrating the improved rotor.

FIGURE 6 is a schematic elevational flow diagram of a typical coal injection system incorporating the novel rotary feeder therein.

FIGURE 7 is an enlarged view of a portion of FIGURE 6 showing the arrangement of the rotary feeders, the intake conduits and discharge conduits connected thereto.

Referring to FIGURE 6 of the drawings, suitably sized particulate coal is delivered to a feeder bin 10 in a conventional manner. Beneath the feeder bin 10 there are a plurality of hoppers or standpipes 12 which receive the coal from feed bin 10 and supply the coal by gravity to rotary feeders 14. Suitable means may be provided to weigh the coal particles in the bin 10 and standpipes 12 and thereby regulate the feed rate of the coal particles from the rotary feeder 14. Minor adjustments in the feed rate from the rotary feeder 14 are necessary due to changes in coal density with variations in moisture content and coal size consist. The amount of coal delivered by the rotary feeder 14 is directly proportional to the speed or the revolutions per minute of the rotary feeder.

Compressed air is supplied from a suitable source to a common header 16. Branch conduits 18 connect the common header 16 to the individual rotary feeders 14. The rotary feeders 14 admix the coal particles fed from standpipe 12 with the compressed air from branch conduits 18 and transfer the fluidized mass of air and coal particles to a transfer line 20, as will be later explained. The fluidized mass is transported through transfer line 20 to suitable splitters 22 diagrammatically shown near a blast furnace bustle pipe 24. From the splitters 22 the fluidized coal particles are delivered through branch conduits 26 to tuyeres 28 of blast furnace 30 where the fluidized coal particles are introduced into the tuyere zone of the blast furnace. Suitable control means and instrumentation may be provided to vary the coal-air ratio, the coal output from the respective rotary feeders 14 and the velocity of the fluidized mass within the respective transfer lines 20.

FIGURE 7 illustrates in greater detail the lower portion of standpipes 12 which feed the coal particles to the rotary feeder 14 and the branch conduits 18 that feed air to the rotary feeder 14 from common header 16.

The improved rotary feeder 14 is illustrated in detail in FIGURES 1–5. Referring particularly to FIGURES 1, 2 and 3 the rotary feeder 14 includes a cylindrical housing or casing 32 with a pair of annular end sections 34 and 36. The top end section 34 is suitably secured to the cylindrical housing 32 by bolts 38 and has an elongated solids inlet aperture 40 connected to an inlet conduit 42. The solids inlet conduit 42 is connected to the lower portion of the standpipe 12. The end section 34 has an air inlet opening 44 diametrically opposed to the solids inlet 40. The branch conduit 18 is connected to the air inlet opening 44. The annular top end section 34 has an inner wall 46 with a pair of concentric circular seal retainer recessed portions 48 and 50 (FIGURES 3 and 4). Although not shown, suitable passageways may be provided in the end section 34 to provide gas under pressure to the concentric circular seal retainer recessed portions 48 and 50. The recessed portions 48 and 50 are illustrated in detail in FIGURES 3 and 4.

The end section 36 is similarly secured to the housing 32 by means of bolts 38 and has an outlet opening (not shown) with a conduit 51 connected thereto. The conduit connects the outlet opening to transfer line 20. The outlet opening in bottom end section 36 is axially aligned with air inlet opening 44 in top end section 34. The lower end section 36 has an inner wall 52 with concentric circular recessed portions 54 and 56. The circular recessed portions 54 and 56 are on the same center as recessed portions 48 and 50 in top end section 34 and are aligned therewith. The lower end section 36 may also be provided with suitable passageways to supply a gas under pressure to the concentric recessed portions 54 and 56. The end sections 34 and 46 have outwardly extending annular flanges 58 and 60 with a pair of thrust sleeves 62 and 64 supported thereon. The end sections 34 and 36 when secured to the housing 32 form a substantially cylindrical chamber in the housing 32.

An annular cylindrically shaped rotor member 66 is positioned within the housing 32 and substantially fills the cylindrical chamber formed in the housing 32. The rotor member 66 has end walls 68 and 70 which abut the respective section inner walls 46 and 52. A shaft 72 extends through the central bore 74 of rotor 66 and is suitably keyed thereto for rotation therewith. The shaft 72 has its lower portion supported by thrust sleeve 64, bearings 78 and end cap 80. The cap 80 is suitably secured to the lower end section 36 by bolts 82 (FIGURE 3). The upper end portion of shaft 72 is supported by thrust sleeve 62, bearings 84 and annular cap 86, and the annular end cap 86 is suitably secured to the end section 34 by bolts 82. The shaft 72 has a portion 88 extending through the annular end cap 86 and is arranged to be connected to a suitable drive means. With this arrangement shaft 72 rotates the rotor member 66 within the housing 32.

The rotor 66 is illustrated in detail in FIGURES 3 and 5 and includes a plurality of longitudinal bores or passageways 90 that are spaced from each other and inwardly from the rotor peripheral wall 92. The passageways 90 are radially equidistant from the rotor axis and form a circular series of passageways in the rotor 66. The passageways 90 are arranged so that they pass under both the solids inlet opening 40 and air inlet opening 44 during rotation of rotor 66. The relation of passageways 90 and openings 40 and 44 is clearly illustrated in FIGURE 2.

Positioned within the recesses 48, 50, 54 and 56 are suitable annular running seals 94 which seal the segment of the rotor 66 on opposite radial sides of the passageways 90 and provide a pressure seal for the passageways 90. The relative position of the seals 94 in top end section 34 is illustrated in FIGURE 4. The seals 94 are preferably urged against the rotor end walls 68 and 70 by a gas under pressure.

With this arrangement coal or other particulate material is introduced through opening 40 into the passageways 90 positioned therebelow. Rotation of the rotor 66 with shaft 72 moves the passageways 90 filled with particulate material from solids inlet opening 40 through a semicircular arc where the passageways 90 are then axially aligned with the air inlet opening 44. Air entering through opening 44 from conduit 18 discharges the coal within the respective passageway through the discharge opening 51 in lower end section 36 and admixes the particulate material with the air to form a fluidized mass. The rate of feed of particulate material to conduit 20 is controlled by the timed revolutions of the rotor 66. The particulate material entering the rotary feeder 14 through inlet opening 40 is at atmospheric pressure and flows by gravity into the passageways positioned beneath the inlet opening 40. The air entering inlet opening 40 is at an elevated pressure and ejects the particulate material from the passageway therebeneath. Since the end walls 68 and 70 of rotor 66 are subjected to the elevated air pressure through inlet opening 44, suitable seal means must be provided for preventing leakage between the rotor and the casing 32. The rotor end walls 68 and 70 between the concentric seals 94 are in contiguous relation with the end section inner walls 46 and 52 and all of the walls have accurately machined surfaces to minimize air leakage between air inlet opening 44 and solids inlet opening 40.

The upper end section 34 has a plurality of vertical bores or passageways 96 arranged in a semicircular pattern (FIGURES 3 and 4). The individual passageways 96 are, for clarity, designated, in a counter clockwise manner, in FIGURE 4 as 96a, 96b, 96c, 96d, 96e, 96f and 96g, and extend between the solids inlet opening 40 and air inlet opening 44. The end section 34 has another plurality of passageways 98 extending from solids inlet opening 40 to air inlet opening 44 which, for clarity, are designated 98a, 98b, 98c, 98d, 98e, 98f and 98g. The passageways 96 and 98 are in overlying relation and are axially aligned with the passageways 90 in rotor 66. Each of the passageways 96 and 98 communicates with separate radial passageways 100. Separate external conduits 102 connect the respective passageways 96a and 98a, 96b and 98b, etc. With this arrangement the passageways 96 and 98 having the same alphabetical designation are connected to each other by an external conduit 102.

In FIGURE 2 and FIGURE 3 the common conduit connecting the respective passageways in end section 34 are identified by the same alphabetical designation. Thus the external conduits 102 are arranged to equalize the pressure on opposite sides of a transverse axis passing through the solids inlet opening 40 and air inlet opening 44. It should be understood, although external conduits 102 are illustrated, that internal corings or passageways within the end section 34 could be utilized to connect the various passageways 96 and 98.

*Operation*

Coal particles from feeder bin 10 are delivered by gravity via the standpipe 12 to the rotary feeder 14. The coal flows through inlet conduit 42 to the inlet opening 40 in top end section 34. When it is desired to feed coal particles to the pressurized air stream the driving means is energized to rotate the rotor 66 at a preselected rate. During rotation of rotor 66 the passageways 90 move into alignment with the inlet opening 40 in top end section 34 and are filled with particulate coal from inlet conduit 42. Assuming a clockwise rotation as viewed in FIGURE 2, each passageway 90 after receiving a supply of coal particles rotates through a semicircular arc and moves into alignment with air inlet opening 44 and discharge conduit 51. Compressed air or other fluid under pressure is supplied via conduit 18 to the air inlet opening 44 in feeder top end section 34. When the passageway 90 is aligned with the air inlet opening 44, the coal particles are ejected from the passageway with the air flowing therethrough. The coal particles are admixed with the air and are discharged into outlet conduit 51 and transported as a mixture of coal particles suspended in air through transfer conduit 20 to the splitter 22 and thence to the blast furnace 30.

As the air under pressure empties the bore or passageway 90 in alignment with the air inlet opening 44 and discharge conduit 51, the passageway 90 is pressurized to the same pressure as the air entering the casing through inlet opening 44. The passageway 90 would normally remain pressurized, except for incidental leakage, until it was again aligned with the coal inlet opening 40. At coal inlet opening 40 the pressurized air would obstruct the normal gravity flow of coal into the passageways and reduce the overall effectiveness of the rotary feeder 14.

To reduce the pressure in the passageway 90 as the rotor rotates, a pressure equalizing means is provided. The rotation of the rotor 66 causes the passageway 90 to communicate first with passageway 98g in top end section 34. The rotation of rotor 66 is assumed to be in a counter clockwise direction in FIGURE 4. Passageway 98g is in communication with passageway 96g through radial passageways 100 in top end section 34 and external conduit 102g. Thus the pressure rotor in passageway 90 communicating with passageway 98g is incrementally reduced by increasing the pressure in a rotor passageway 90 communicating with passageway 96g. Further rotation of rotor 66 sequentially moves the rotor passageway 90 into communication with passageway 98f in end section 34 which further reduces the pressure in the passageway by communicating through external conduit 102f to passageway 96f in end section 34 and a passageway 90 in rotor 66 at a lower pressure than the rotor passageway communicating with passageway 98f. Still further rotation of rotor 66 sequentially positions the passageway 90 in alignment with end section passageways 98e, 98d, 98c, 98b and 98a. Since these end section passageways communicate through external conduits 102 with mating passageways 96e, 98d, 98c, 98b and 98a, the pressure in the rotor passageway is incrementally reduced as it moves from the air inlet opening 44 toward the coal inlet opening 40.

Also, the pressure in the rotor passageway is increased as it moves from coal inlet opening 40 to air inlet opening 44. With this arrangement the rotor passageway 90 as it approaches the coal inlet opening 40 is depressurized so that air within the rotor passageway does not hamper filling the rotor passageway with coal. If desired, although not illustrated, the passageway 96a may be vented to atmosphere or may have a negative pressure applied thereto to assure complete depressurization of the rotor passageway before it moves into the coal receiving position. It will be apparent that the cross venting of the rotor passageways 90 eliminates any large pressure differential between any two adjacent points in the rotor's position.

The novel rotor construction herein disclosed where the coal carrying pockets are passageways within the rotor periphery, permits the use of concentric seal rings on opposite sides of the rotor passageways. The concentric seal rings confine the pressurized air to an annular ring on each side of the rotor between the concentric seals.

According to the provisions of the patent statutes, the principle, preferred construction, and mode of operation of the invention have been explained, and what is now considered to represent its best embodiment has been illustrated and described. However, it should be understood that, within the scope of the appended claims, the invention may be practiced otherwise than as specifically illustrated and described.

I claim:
1. A rotary feeder comprising
   a cylindrical casing having an annular body portion, a top end section and a bottom end section,
   said end sections with said annular body portion therebetween defining a cylindrical chamber in said casing,
   a shaft axially positioned in said chamber and rotatably supported by said casing,
   a unitary annular rotor member coaxially positioned on said shaft within said cylindrical chamber, said rotor member secured to said shaft for rotation therewith,
   said rotor member having a cylindrical side wall and a pair of spaced end walls, said rotor member substantially filling said cylindrical chamber with said end walls abutting the inner surface of said casing end sections,
   said rotor member having a plurality of axial passageways arranged in a circular configuration about the axis of said rotor member,
   said passageways spaced inwardly from said rotor member cylindrical side wall,
   said top end section inner surface having a pair of concentric recesses therein on opposite sides of said rotor passageway circular configuration,
   said bottom end section inner surface having a pair of concentric recesses therein on opposite sides of said rotor passageway circular configuration,
   said casing top end section having a solids inlet opening in overlying relation with said rotor passageways and arranged to feed particulate material to said rotor passageways,
   said casing top end section having a fluid inlet opening in overlying relation with said rotor passageways and diametrically spaced from said solids inlet,
   said casing bottom end section having an outlet opening aligned with said fluid inlet opening,
   seal means positioned in all of said recesses in said top and bottom end section inner surfaces, means to urge said seal means against said respective cylindrical rotor end walls,
   said seal means arranged to reduce leakage of said fluid entering through said fluid inlet into said cylindrical chamber of said casing and to provide a pressure seal for annular areas between said respective seals,
   said rotor passageways arranged to first communicate with said solids inlet opening and receive particulate material therein and thereafter upon further rotation of said rotor to communicate with said aligned fluid inlet and outlet openings so that said fluid entering through said fluid inlet discharges said particulate material from said passageways through said outlet opening in said casing,
   said top end section having a plurality of vertical pressure equalizing passageways arranged in a circular configuration in overlying relation with said rotor passageways, each of said vertical pressure equalizing passageways having a horizontal passageway communicating therewith,
   means connecting a first pair of said horizontal passageways on opposite sides of and adjacent to said fluid inlet passageway to equalize the pressure in said rotor passageways communicating with said first pair of pressure equalizing passageways, and
   other means to connect other horizontal passageways equally spaced from said fluid inlet to thereby equalize the pressure in said rotor passageways communicating with said interconnected vertical pressure equalizing passageways.

2. A rotary feeder as set forth in claim 1 in which said means connecting said horizontal passageways includes tubular conduits extending around the periphery of said casing.

3. A rotary feeder comprising
a cylindrical casing having an annular body portion, a top end section and a bottom end section,
said end sections with said annular body portion therebetween defining a cylindrical chamber in said casing,
a shaft axially positioned in said chamber and rotatably supported by said casing,
a unitary annular rotor member coaxially positioned on said shaft within said cylindrical chamber, said rotor member secured to said shaft for rotation therewith,
said rotor member having a cylindrical side wall and a pair of spaced end walls, said rotor member substantially filling said cylindrical chamber with said end walls abutting the inner surface of said casing end sections,
said rotor member having a plurality of axial passageways arranged in a circular configuration about the axis of said rotor member,
said passageways spaced inwardly from said rotor member cylindrical side wall,
one of said end sections having a plurality of vertical bores arranged in a circular pattern and axially aligned with said rotor passageways,
said top end section inner surface having a pair of concentric recesses therein on opposite sides of said rotor passageway circular configuration,
said bottom end section inner surface having a pair of concentric recesses therein on opposite sides of said rotor passageway circular configuration,
said casing top end section having a solids inlet opening in overlying relation with said rotor passageways and arranged to feed particulate material to said rotor passageways,
said casing top end section having a fluid inlet opening in overlying relation with said rotor passageways and diametrically spaced from said solids inlet,
said casing bottom end section having an outlet opening aligned with said fluid inlet opening,
other passageways connected to each of said vertical passageways and interconnected with each other on opposite sides of said solids inlet opening and said solids outlet opening to incrementally depressurize said rotor passageways as said rotor passageways move from said fluid inlet to said solids inlet and simultaneously incrementally pressurize said rotor passageways as said rotor passageways move from said solids inlet to said fluid inlet,
seal means positioned in all of said recesses in said top and bottom end section inner surfaces,
said seal means arranged to reduce leakage of said fluid entering through said fluid inlet into said cylindrical chamber of said casing to provide a pressure seal for annular areas between said respective seals,
said rotor passageways arranged to first communicate with said solids inlet opening and receive particulate material therein and thereafter upon further rotation of said rotor to communicate with said aligned fluid inlet and outlet openings so that said fluid entering through said fluid inlet discharges said particulate material from said passageways through said outlet opening in said casing.

References Cited by the Examiner

UNITED STATES PATENTS

| | | | |
|---|---|---|---|
| 2,680,683 | 6/54 | Obenshain | 222—194 |
| 2,858,212 | 10/58 | Durant | 222—194 |
| 2,933,208 | 4/60 | Green | 214—17 |
| 3,101,853 | 8/63 | Long | 302—49 |

FOREIGN PATENTS 65,727  11/55  France.

SAMUEL F. COLEMAN, *Primary Examiner.*

ANDRES H. NIELSEN, *Examiner.*